United States Patent
Bharadwaj et al.

(10) Patent No.: US 12,080,114 B2
(45) Date of Patent: *Sep. 3, 2024

(54) SYSTEM AND METHOD OF USING MECHANICAL SYSTEMS PROGNOSTIC INDICATORS FOR AIRCRAFT MAINTENANCE

(71) Applicant: Honeywell International Inc., Charlotte, NC (US)

(72) Inventors: Raj Mohan Bharadwaj, Maple Grove, MN (US); Kyusung Kim, Plymouth, MN (US); Kwong Wing Au, Bloomington, MN (US); Paul Frederick Dietrich, Brooklyn Park, MN (US); Piyush Ranade, Minneapolis, MN (US); Andrew Peter Vechart, Plymouth, MN (US); Megan Hawley, Roseville, MN (US); Abraham Reddy, Minneapolis, MN (US); Craig Schimmel, Rio Rancho, NM (US); David Daniel Lilly, Ramona, CA (US)

(73) Assignee: Honeywell International Inc., Charlotte, NC (US)

(*) Notice: Subject to any disclaimer, the term of this patent is extended or adjusted under 35 U.S.C. 154(b) by 92 days.

This patent is subject to a terminal disclaimer.

(21) Appl. No.: 17/155,364

(22) Filed: Jan. 22, 2021

(65) Prior Publication Data

US 2021/0319636 A1    Oct. 14, 2021

Related U.S. Application Data

(63) Continuation of application No. 15/916,874, filed on Mar. 9, 2018, now Pat. No. 10,909,781.

(51) Int. Cl.
*G07C 5/08* (2006.01)
*B64F 5/60* (2017.01)
(Continued)

(52) U.S. Cl.
CPC .............. *G07C 5/0816* (2013.01); *B64F 5/60* (2017.01); *G06F 16/22* (2019.01); *G06F 16/955* (2019.01); *G07C 5/0841* (2013.01)

(58) Field of Classification Search
CPC .... G07C 5/0816; G07C 5/0841; G07C 5/008; G07C 5/0808; B64F 5/60; B64F 5/40;
(Continued)

(56) References Cited

U.S. PATENT DOCUMENTS

| 5,210,704 A | 5/1993 | Husseiny |
| 6,907,416 B2 | 6/2005 | Tasooji et al. |

(Continued)

FOREIGN PATENT DOCUMENTS

| EP | 2063399 A2 | 5/2009 |
| EP | 3441947 B1 | 10/2020 |

OTHER PUBLICATIONS

Steele, Jim, "Scientist Creates AI Algorithm to Monitor Machinery Health," retrieved from https://phys.org/news/2016-02-scientist-ai-algorithm-machinery-health.html, Feb. 3, 2016.
(Continued)

*Primary Examiner* — Abdalla A Khaled
(74) *Attorney, Agent, or Firm* — Alston & Bird LLP

(57) ABSTRACT

A method in an aircraft of using prognostic indicators for aircraft maintenance includes retrieving aircraft health data for a plurality of aircraft components wherein the aircraft health data includes at least one of mechanical systems condition indicator (CI) data, vibration spectrum data, resampled time-domain (RTD) data, and RTD spectrum data. The method includes estimating component health status
(Continued)

information for the plurality of aircraft components using a plurality of prognostic modules wherein each prognostic module is configured to generate health status information for at least one of the aircraft components, the health status information includes at least one of a current health indicator and a prognostic indicator. The method also includes storing the component health status information for the aircraft components in a database onboard the aircraft, and causing the display of the health status information for the specific component on an aircraft display.

20 Claims, 6 Drawing Sheets

(51) Int. Cl.
*G06F 16/22* (2019.01)
*G06F 16/955* (2019.01)

(58) Field of Classification Search
CPC ... G06F 16/22; G06F 16/955; G05B 23/0281; G05B 23/0283; B64D 2045/0085; G06N 20/00
See application file for complete search history.

(56) References Cited

U.S. PATENT DOCUMENTS

| | | | |
|---|---|---|---|
| 7,027,953 B2 | 4/2006 | Klein | |
| 7,581,434 B1 | 9/2009 | Discenzo et al. | |
| 7,914,250 B2 | 3/2011 | Behera et al. | |
| 7,984,146 B2 | 7/2011 | Rozak et al. | |
| 8,417,410 B2 | 4/2013 | Moeckly et al. | |
| 8,478,479 B2 | 7/2013 | Ghelam | |
| 9,734,001 B2 | 8/2017 | Das et al. | |
| 10,699,040 B2* | 6/2020 | Martin | G05B 23/0283 |
| 2003/0074159 A1 | 4/2003 | Bechhoefer et al. | |
| 2004/0176887 A1 | 9/2004 | Kent et al. | |
| 2010/0161197 A1* | 6/2010 | Moeckly | G05B 23/0254 701/99 |
| 2010/0161274 A1* | 6/2010 | Leao | G05B 23/0243 702/182 |
| 2011/0054806 A1* | 3/2011 | Goldfine | G07C 3/00 702/34 |
| 2012/0283963 A1* | 11/2012 | Mitchell | F01D 21/003 702/34 |
| 2013/0138632 A1 | 5/2013 | Yost | |
| 2013/0253898 A1* | 9/2013 | Meagher | G06N 20/00 703/18 |
| 2014/0100738 A1* | 4/2014 | Itatsu | G07C 5/0825 701/33.4 |
| 2014/0156166 A1* | 6/2014 | Moeckly | F02D 45/00 701/32.4 |
| 2015/0160098 A1* | 6/2015 | Noda | G01M 99/00 702/35 |
| 2015/0302163 A1* | 10/2015 | Das | G06N 3/02 705/2 |
| 2016/0259873 A1* | 9/2016 | Kessie | G05B 23/0283 |
| 2017/0166328 A1* | 6/2017 | Ethington | G06Q 10/20 |
| 2017/0193372 A1* | 7/2017 | Schimert | G06N 5/04 |
| 2017/0369190 A1* | 12/2017 | Ethington | B64F 5/60 |
| 2018/0011481 A1* | 1/2018 | Smit | G07C 5/0808 |
| 2018/0096084 A1* | 4/2018 | Sheldon | G05B 23/0283 |
| 2018/0136995 A1* | 5/2018 | Sheppard | G06N 7/01 |
| 2018/0346151 A1* | 12/2018 | Sturlaugson | G06N 20/20 |
| 2018/0350165 A1* | 12/2018 | Moravek | G07C 5/085 |
| 2019/0025810 A1* | 1/2019 | Chapin | G06Q 10/04 |
| 2019/0092495 A1* | 3/2019 | Lu | G07C 5/0816 |
| 2019/0378349 A1* | 12/2019 | Liu | G07C 5/006 |

OTHER PUBLICATIONS

Wade, et al., Using Machine Learning Algorithms to Improve HUMS Performance, retrieved from https://www.researchgate.net/publication/283694418_Using_machine_learning_algorithms_to_improve_HUMS_performance, Jan. 31, 2015.

Wade, et al., "Applying Machine Learning-Based Diagnostic Functions to Rotorcraft Safety," retrieved from http://www.humsconference.com.au/Papers2017/Non_Peer_Reviewed/071_HUMS2017_Wade_HUMS_Best_Presentation.pdf, Feb. 26, 2017.

Yang, et al. "Developing Machine Learning-Based Models to Estimate Time to Failure for PHM," Retrieved from http://ieeexplore.ieee.org/document/7542876/, Jun. 20, 2016.

Ma, Jian, et al. "Predicting the Remaining Useful Life of an Aircraft Engine Using a Stacked Sparse Autoencoder with Multilayer Self-Learning." Complexity, vol. 2018, 2018, pp. 1-13., doi:10.1155/2018/3813029. (Year: 2018).

Han, Young-Seang, et al. "A Learning Pattern Recognition System Using Neural Network for Diagnosis and Monitoring of Aging of Electrical Motor." Proceedings of the 1992 International Conference on Industrial Electronics, Control, Instrumentation, and Automation, doi: 10.1109/iecon.1992.254463. (Year: 1992).

* cited by examiner

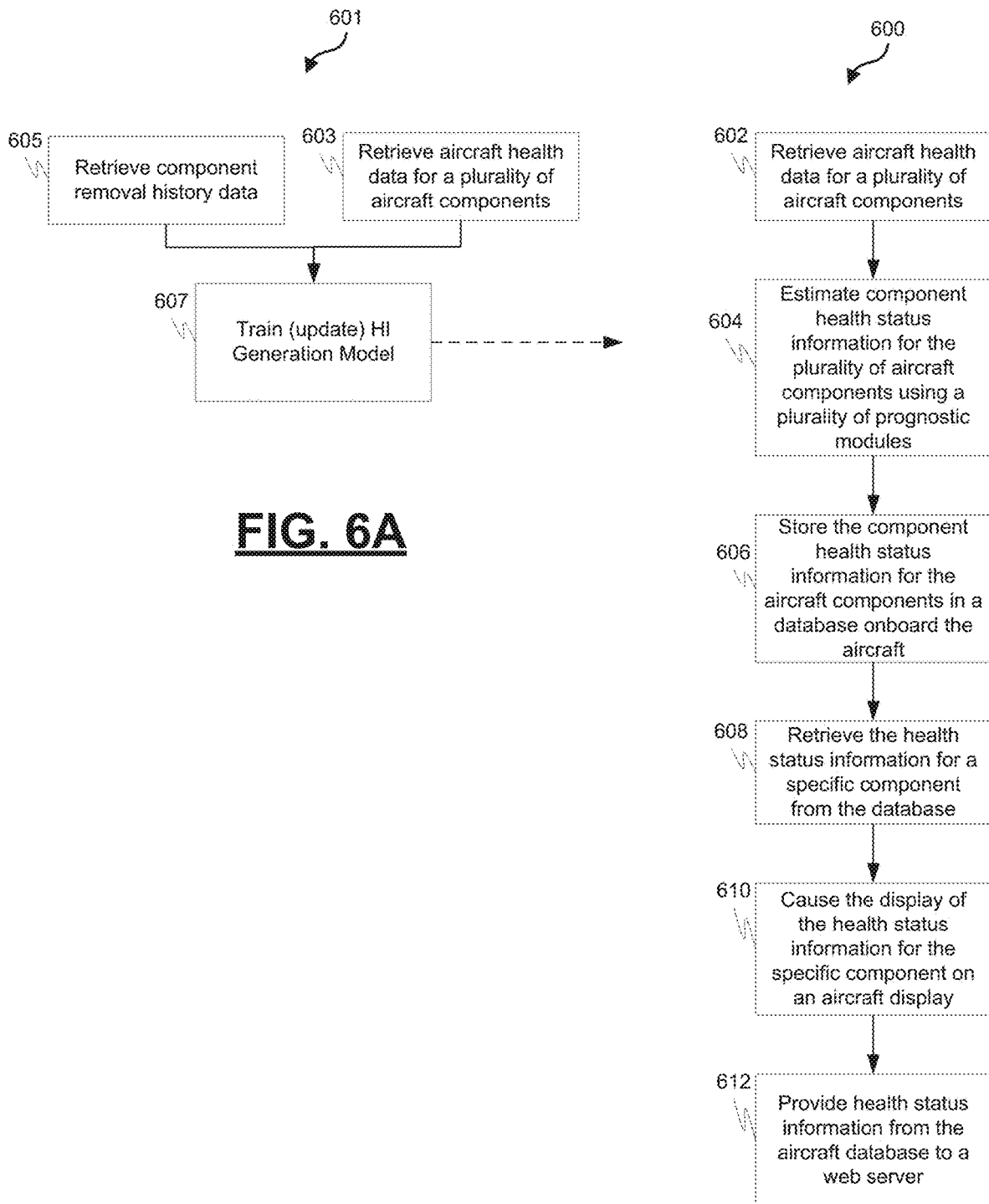

SYSTEM AND METHOD OF USING MECHANICAL SYSTEMS PROGNOSTIC INDICATORS FOR AIRCRAFT MAINTENANCE

CROSS-REFERENCE TO RELATED APPLICATION(S)

This patent application is a continuation of and claims the benefit of priority to U.S. Nonprovisional patent application Ser. No. 15/916,874, filed on Mar. 9, 2018, the entirety of which is incorporated herein by reference.

STATEMENT REGARDING FEDERALLY SPONSORED RESEARCH OR DEVELOPMENT

This invention was made with Government support under contract number W911W6-13-2-0007 awarded by the US Army AATD. The Government has certain rights in this invention.

TECHNICAL FIELD

The present invention generally relates to maintenance tools for use by aircraft maintainers, and more particularly relates to prognostic maintenance tools for use by aircraft maintainers.

BACKGROUND

Onboard aircraft troubleshooting tools are available on an aircraft to assist aircraft maintenance personnel in diagnosing and resolving problems. These tools may identify a problem with an aircraft component or system after a problem has occurred. These tools are focused on identifying current problems and not future problems.

Hence, it is desirable to provide systems and methods for using prognostic indicators to predict when in the future a problem may occur. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A computer-implemented system configured to provide prognostic indicators for use in aircraft maintenance is disclosed. The system includes a computer-implemented prognostic system module on an aircraft wherein the computer-implemented prognostic system module is configured to retrieve aircraft health data for a plurality of aircraft components. The aircraft health data includes at least one of mechanical systems condition indicator (CI) data, vibration spectrum data, resampled time-domain (RTD) data, and RTD spectrum data. The computer-implemented prognostic system module is further configured to estimate component health status information for the plurality of aircraft components using a plurality of prognostic modules wherein each prognostic module is configured to generate health status information for at least one of the aircraft components, the health status information includes at least one of a current health indicator and a prognostic health indicator, the current health indicator provides an indication of the estimated current health of the component, and the prognostic health indicator provides an indication of the estimated health of the component in one or more future time horizons. The computer-implemented system further includes a computer-implemented display interface module that is configured to cause the display of the health status information for a user selected component from the plurality of aircraft components on an aircraft display.

An aircraft maintenance system for an aircraft is disclosed. The system includes one or more processors configured by programming instructions encoded on non-transient computer readable media. The system is configured to retrieve aircraft health data for a plurality of aircraft components wherein the aircraft health data includes at least one of mechanical systems condition indicator (CI) data, vibration spectrum data, resampled time-domain (RTD) data, and RTD spectrum data. The system is further configured to estimate component health status information for the plurality of aircraft components using a plurality of prognostic modules wherein each prognostic module is configured to generate health status information for at least one of the aircraft components, the health status information includes at least one of a current health indicator and a prognostic health indicator, the current health indicator provides an indication of the estimated current health of the component, and the prognostic health indicator provides an indication of the estimated health of the component in one or more future time horizons. The system is also configured to cause the display of the health status information for a user selected component from the plurality of aircraft components on an aircraft display.

A computer-implemented method in an aircraft of using prognostic indicators for aircraft maintenance is disclosed. The method includes retrieving aircraft health data for a plurality of aircraft components wherein the aircraft health data includes at least one of mechanical systems condition indicator (CI) data, vibration spectrum data, resampled time-domain (RTD) data, and RTD spectrum data. The method further includes estimating component health status information for the plurality of aircraft components using a plurality of prognostic modules wherein each prognostic module is configured to generate health status information for at least one of the aircraft components, the health status information includes at least one of a current health indicator and a prognostic indicator, the current health indicator provides an indication of the estimated current health of the component, and the prognostic indicator provides an indication of the estimated health of the component in one or more future time horizons. The method also includes storing the component health status information for the aircraft components in a database onboard the aircraft, retrieving the health status information for a specific component from the database, and causing the display of the health status information for the specific component on an aircraft display.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 6A is a process flow chart depicting an example process for training a model to generate prognostic indicators for aircraft maintenance, in accordance with some embodiments; and FIG. 6B is a process flow chart depicting an example process in an aircraft of using prognostic indicators for aircraft maintenance, in accordance with some embodiments.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
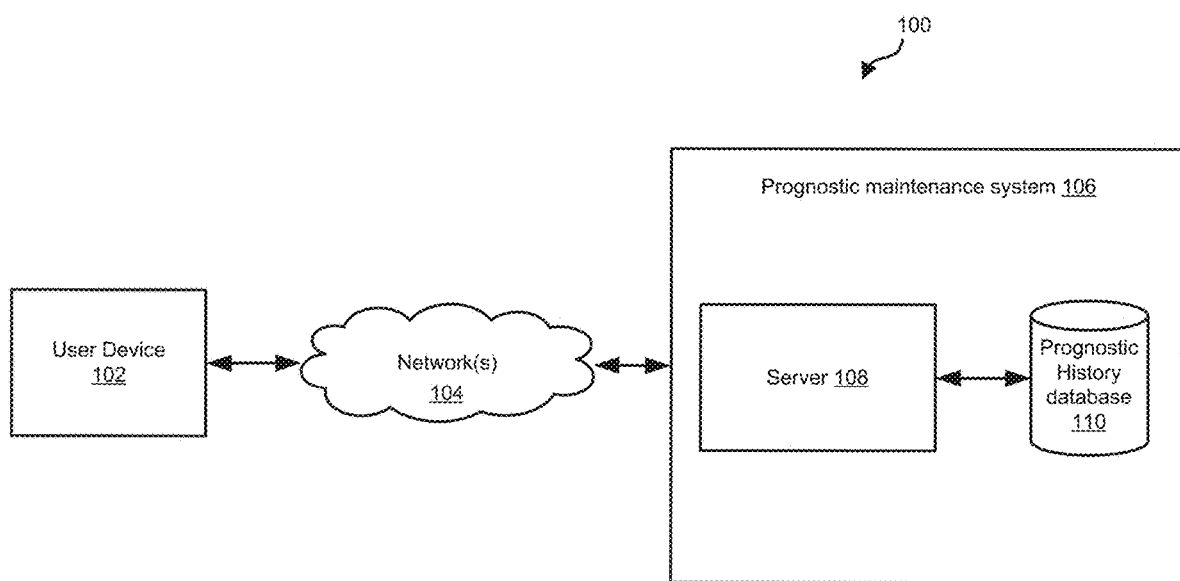
FIG. 1 is a block diagram depicting an example environment 100 in which an example prognostic maintenance system may be accessed, in accordance with some embodiments

FIG. 1 is a block diagram depicting an example environment 100 in which an example prognostic maintenance system may be accessed. In the example environment 100, one or more users using a user device 102, such as a smart phone, tablet, laptop, etc., may, via a network 104, access a prognostic maintenance system 106 to receive prognostic information regarding the health of various systems on an aircraft such as a rotorcraft. The example prognostic maintenance system 106 is configured to retrieve aircraft health data (e.g., condition indicator (CI) data, spectrum data, resampled time-domain (RTD) data, and/or RTD spectrum data) and analyze the aircraft health data to determine the health of a number of mechanical components in the aircraft such as a gearbox, bearings, and other components.

The example prognostic maintenance system 106 includes a server 108 that is configured to provide a user device 102, via presentation software, prognostic information regarding aircraft components that is stored in a prognostic history database 110. The prognostic history database 110 may comprise an aircraft specific database such as one that resides onboard an aircraft. An onboard aircraft specific database may include prognostic information regarding aircraft components and systems for the specific aircraft on which the database resides. The prognostic history database 110 may also comprise an off-board database that does not reside on an aircraft. An off-board database may contain prognostic information regarding aircraft components and systems for a plurality of aircraft.

Communication between a user device 102 and the example server 108 may be App-based (e.g., using an application program executing on the user device), browser based, or both. The presentation software may be configured to operate through a browser, an App, or both.

Figure 2A:
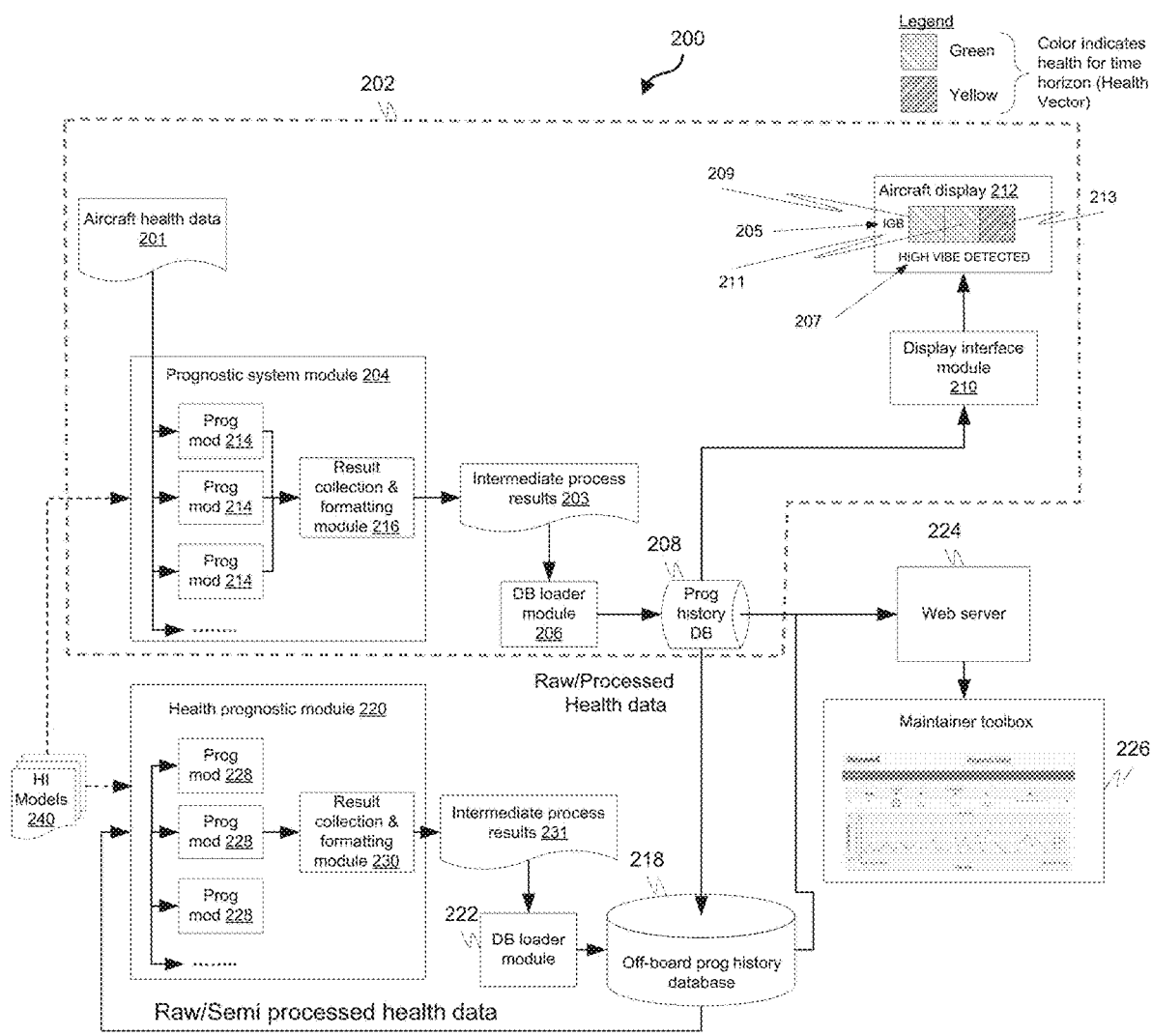
FIG. 2A is a block diagram depicting an example prognostic maintenance system, in accordance with some embodiments.

FIG. 2A is a block diagram depicting an example prognostic maintenance system 200. The example prognostic maintenance system 200 includes both on-board components 202 (e.g., components residing on an aircraft) and off-board components. The on-board components 202 include a prognostic system module 204, a database loader module 206, a prognostic history database 208, and a display interface module 210 that interfaces with an aircraft display 212.

The example prognostic system module 204, example database loader module 206, and example display interface module 210 may be implemented by a controller. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example prognostic system module 204 includes a collection of prognostic modules 214 that operate on collected aircraft health data 201. The aircraft health data 201 may include condition indicator (CI) data, spectrum data, resampled time-domain (RTD) data, and/or RTD spectrum data. The aircraft health data 201 can be analyzed to determine health indicators for a number of mechanical components in the aircraft such as a gearbox, bearings, and other components. Each prognostic module 214 is configured to implement one or more algorithms to analyze some or all of the health data 201 to estimate the current health state of various aircraft components and in some cases to additionally predict the future health state of various components. The prognostic modules 214 may be implemented using a number of programming languages. The results from various prognostic modules 214 may also be combined and further analyzed within the example prognostic system module 204 to provide prognostic information such as health trend and health prediction information.

A result and collection formatting module 216 is included in the example prognostic system module 204 to collect and format the generated prognostic information for storage. As an example, the result and collection formatting module 216 may generate an intermediate process results file 203 such as a csv file that identifies the aircraft and provides data regarding the current health and prognostic state for various aircraft components on the aircraft. The result and collection formatting module 216 may also collect and format raw aircraft health data 201 for storage via the intermediate process results file 203.

The example database loader module 206 is configured to retrieve the intermediate process results file 203 from the prognostic system module 204 and cause the data in the intermediate process results file 203 to be stored in the on-board prognostic history database 208. The database loader module 206 is configured to monitor for the generation of data for the intermediate process results file 203 and, when data is added to the intermediate process results file 203, cause the data to be stored in the prognostic history database 208, which may add to a body of information regarding the health of various components on the aircraft.

The example display interface module 210 is configured to function as an interface between the prognostic history database 208 and the aircraft display 212. In one example mode of operation, the example display interface module 210 is configured to monitor the prognostic history database 208 for updated health state and prognostic information, retrieve the latest health state and prognostic information from the prognostic history database 208 for one or more aircraft components, format the health state and prognostic information for display on the aircraft display 212, and cause the health state and prognostic information to be displayed on an aircraft display 212.

In the example image illustrated on the aircraft display 212 in FIG. 2A, an asset name 205, a health indicator 207, and three time horizons 209, 211, 213 are displayed. The asset name 205 identifies the aircraft component (intermediate gear box (IGB) in this example) to which the health state and prognostic information being displayed relates. The health indicator 207, in this example, identifies that high vibration was detected regarding the IGB. In this example, prognostic information is provided for future time horizons such as a first time horizon 209 covering 0-4 hours of flight time in the future, a second time horizon 211 covering 4-16 hours of flight time in the future, and a third time horizon 213 covering 16-32 hours of flight time in the future. The prognostic information, in this example, is indicated in each flight horizon by one of three colors: green, yellow, and red. The green color indicates that the prognosis for the component during the time horizon is good (e.g., component failure is not expected), the yellow color indicates that the prognosis for the component during the time horizon is cautious (e.g., component failure could occur), and the red color indicates that the prognosis for the component during the time horizon is not good (e.g., component failure is predicted).

The example prognostic maintenance system 200 also includes components that do not reside on an aircraft that can provide additional information for an aircraft maintainer. These components include an off-board prognostic history database 218, a prognostic system module 220, a database loader module 222, a web server 224 and an aircraft maintainer's toolbox 226.

While the on-board prognostic history database 208 is configured to store health state and prognostic information regarding the aircraft on which it resides, the off-board prognostic history database 218 is configured to store health state and prognostic information for multiple aircraft. Raw health data, health state, and prognostic information from multiple on-board prognostic history databases 208 may be stored in the off-board prognostic history database 218 as well as health state and prognostic information calculated by the prognostic system module 220.

The prognostic system module 220 includes a collection of prognostic modules 228 that operate on raw health data, health state, and prognostic information stored in the off-board prognostic history database 218. The raw health data, health state, and prognostic information can be analyzed by one or more of the prognostic modules 228 to determine health indicators for a number of mechanical components in an aircraft. Each prognostic module 228 is configured to implement one or more algorithms to analyze some or all of the raw health data, health state, and prognostic information to estimate the current health state of various aircraft components and in some cases to additionally predict the future health state of various components. The prognostic modules 228 may be implemented using a number of programming languages. The results from various prognostic modules 228 may also be combined and further analyzed within the example prognostic system module 220 to provide prognostic information such as health trend and health prediction information.

A result and collection formatting module 230 is included in the example prognostic system module 220 to collect and format the generated prognostic information for storage. As an example, the result and collection formatting module 220 may generate an intermediate process results file 231 such as a csv file that identifies the aircraft and provides data regarding the current health and prognostic state for various aircraft components on the aircraft.

The example database loader module 222 is configured to retrieve the intermediate process results file 231 from the prognostic system module 220 and cause the data in the intermediate process results file 231 to be stored in the off-board prognostic history database 218. The database loader module 222 is configured to monitor for the generation of data for the intermediate process results file 231 and, when data is added to the intermediate process results file 231, cause the data to be stored in the prognostic history database 218, which may add to a body of information regarding the health of various components on aircraft.

The example web server 224 is configured to interface with one or more user devices (e.g., an aircraft maintainer's toolbox 226) to provide a maintainer, via presentation software, prognostic information regarding aircraft components that is stored in an on-board prognostic history database 208, an off-board prognostic history database 218, or both. The example web server 224, such as a python web server, is configured to connect to the database(s) and serve the content pages generated from the database content, for example, via a web browser to an aircraft maintainer's toolbox 226. As an example, a web browser that connects to the example web server 224 may be served a page containing an overview of data for all tail numbers and devices in the database. A user may select via the aircraft maintainer's toolbox 226 to view health indicator data for a specific component relating to a specific aircraft. The maintainer's toolbox 226 may then display a screen such as that shown in FIG. 2B.

Also shown is a set of health indicator models 240. The set of health indicator models can be trained offline using various machine learning techniques and certain trained models from the set deployed by the prognostic system module 204 as prognostic modules 214. The same models deployed in the prognostic system module 204 may also be deployed in the health prognostic module 220 or different models from the set of health indicator models 240 may be deployed in the health prognostic module 220. Because the health prognostic module 220 is deployed offboard, it may comprise greater processing power, more memory, or other features that may allow the health prognostic module 220 to have greater computational power than the prognostic system module 204. Therefore, the health prognostic module 220 may employ prognostic modules 228 that are the same as the prognostic modules 214 or take advantage of the increased computational power and employ prognostic modules 228 that are similar to but different from the prognostic modules 214.

The set of health indicator models 240 may have be trained using tagged aircraft health data. The aircraft health data may include mechanical systems condition indicator (CI) data, vibration spectrum data, resampled time-domain (RTD) data, and RTD spectrum data. The tagged aircraft health data may include aircraft health data that has been tagged with labels including data for one or more faulty component parts. The tagged aircraft health data may also include aircraft health data that has been tagged with labels including data for healthy components. The set of health indicator models 240 can be trained using the healthy and unhealthy data to recognize one or more faulty components.

Figure 2B:
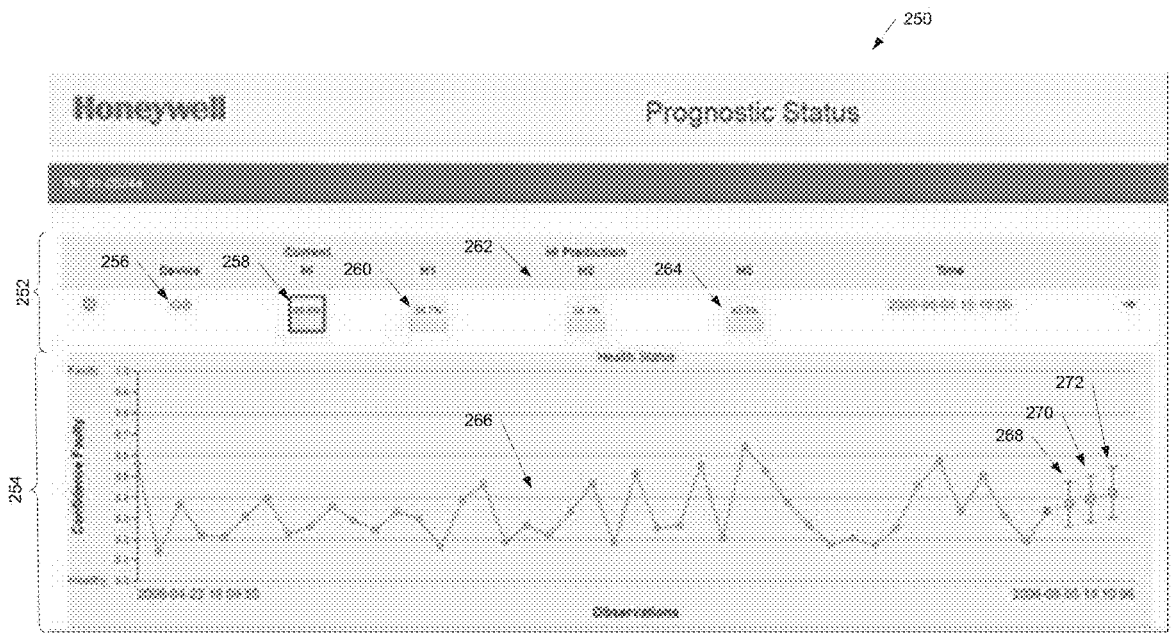
FIG. 2B is a diagram depicting an example screenshot 250 from an aircraft maintainer's toolbox that shows past, current, and prognostic health state information for an aircraft component, in accordance with some embodiments.

FIG. 2B is a diagram depicting an example screenshot 250 from an aircraft maintainer's toolbox that shows past, current, and prognostic health state information for an aircraft component. The example screenshot 250 includes an indicator section 252 and a graphical section 254. The example indicator section 252 includes a device name field 256 (populated with IGB in this example), a current health indicator field 258, a $1^{st}$ time horizon health indicator field 260, a $2^{nd}$ time horizon health indicator field 262, and a $3^{rd}$ health indicator field 264.

Each of the current health indicator field 258, the $1^{st}$ time horizon health indicator field 260, the $2^{nd}$ time horizon health indicator field 262, and the $3^{rd}$ health indicator field 264 includes a computed confidence level percentage that represents the determined level of confidence that the device will be faulty during its time frame and a bar graph whose size within its enclosing box is reflective of the level of confidence that the device will be faulty during its time frame and whose color is reflective of the estimated health state of the device during its time frame. The time frame for the current health indicator field 258, $1^{st}$ time horizon health indicator field 260, the $2^{nd}$ time horizon health indicator field 262, and the $3^{rd}$ health indicator field 264 may, respectively, comprise, for example, the present time, 0-4 hours flight hours in the future, 4-16 hours flight hours in the future, and 16-32 hours flight hours in the future. The bar graph's color, in this example, may comprise green, yellow, and red. The green color may indicate that the prognosis for the component during the time frame is good (e.g., component failure is not expected), the yellow color may indicate that the prognosis for the component during the time frame is cautious (e.g., component failure could occur), and the red color may indicate that the prognosis for the component during the time horizon is not good (e.g., component failure is predicted).

The graphical section 254 includes a line graph 266 that plots the estimated percentages made at different observation points in the past that the device was faulty. The line graph 266 also includes a plotted symbol 268 that provides the estimated percentage that the device will be faulty during the $1^{st}$ time frame, a plotted symbol 270 that provides the estimated percentage that the device will be faulty during the $2^{nd}$ time frame, and a plotted symbol 272 that provides the estimated percentage that the device will be faulty during the $3^{rd}$ time frame.

Figure 3:
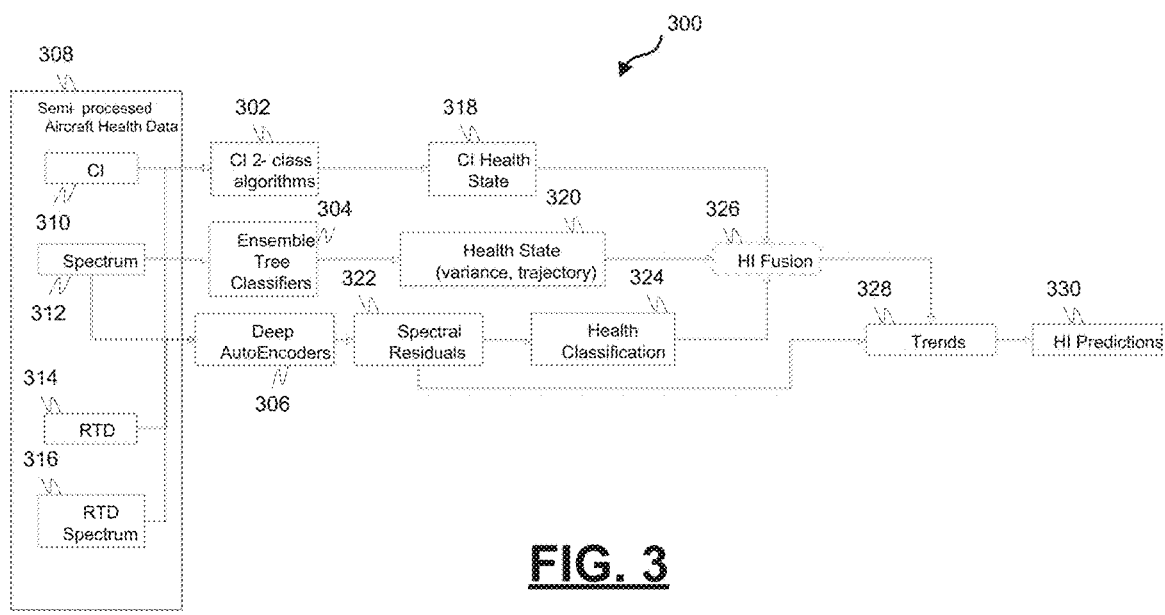
FIG. 3 is a block diagram depicting an example prognostic system that contains example prognostic modules that may be implemented onboard or off-board an aircraft, in accordance with some embodiments.

FIG. 3 is a block diagram depicting an example prognostic system 300 that contains example prognostic modules 302, 304, 306 that may be implemented onboard or off-board an aircraft. The example prognostic modules 302, 304, 306 are configured to receive semi-processed aircraft health data 308 as an input and to output component health indicator data. The semi-processed aircraft health data 308 includes condition indicator (CI) data 310, spectrum data 312, resampled time-domain (RTD) data 314, and RTD spectrum data 316. The example prognostic modules include a CI 2-class module 302, an ensemble tree classifier module 304, and a deep autoencoder module 306.

The example CI 2-class module 302 is configured to analyze all or portions of the aircraft health data 308 and to generate a CI health state indicator 318 for one or more aircraft components based on the analysis. The generated CI health state indicator 318 is a discrete, two-state indicator, for example, health or unhealthy.

The example ensemble tree classifier module 304 is configured to analyze all or portions of the aircraft health data 308 and to generate a health state indicator 320 for one or more aircraft components based on the analysis. The generated health state indicator 320 is a continuous indicator that provides an indication of the degree to which one or more aircraft components are health or unhealthy.

The example deep autoencoder module 306 is configured to analyze all or portions of the aircraft health data 308 and to generate spectral residues 322 for one or more aircraft components based on the analysis. The generated spectral residues 322 provide an indication regarding the health of the one or more aircraft components. The generated spectral residues 322 are input to a health classifier (not shown), which analyzes the spectral residues to generate a health classification 324 for the one or more aircraft components. The generated health classification 324 is a continuous classification that provides an indication of the degree to which one or more aircraft components are health or unhealthy.

The example CI health state indicator 318, example health state indicator 320, and example health classification 324 may be analyzed by a heath indicator fusion module 326, which generates different health state classifications based on the various metrics input to the heath indicator fusion module 326. One or more trend prediction modules may analyze the spectral residues 322 and the health state classifications from the heath indicator fusion module 326 to determine health trends 328 for the one or more aircraft components. The health trends 328 may be used by one or more additional modules to perform health indicator predictions 330 for the one or more aircraft components.

Figure 4:
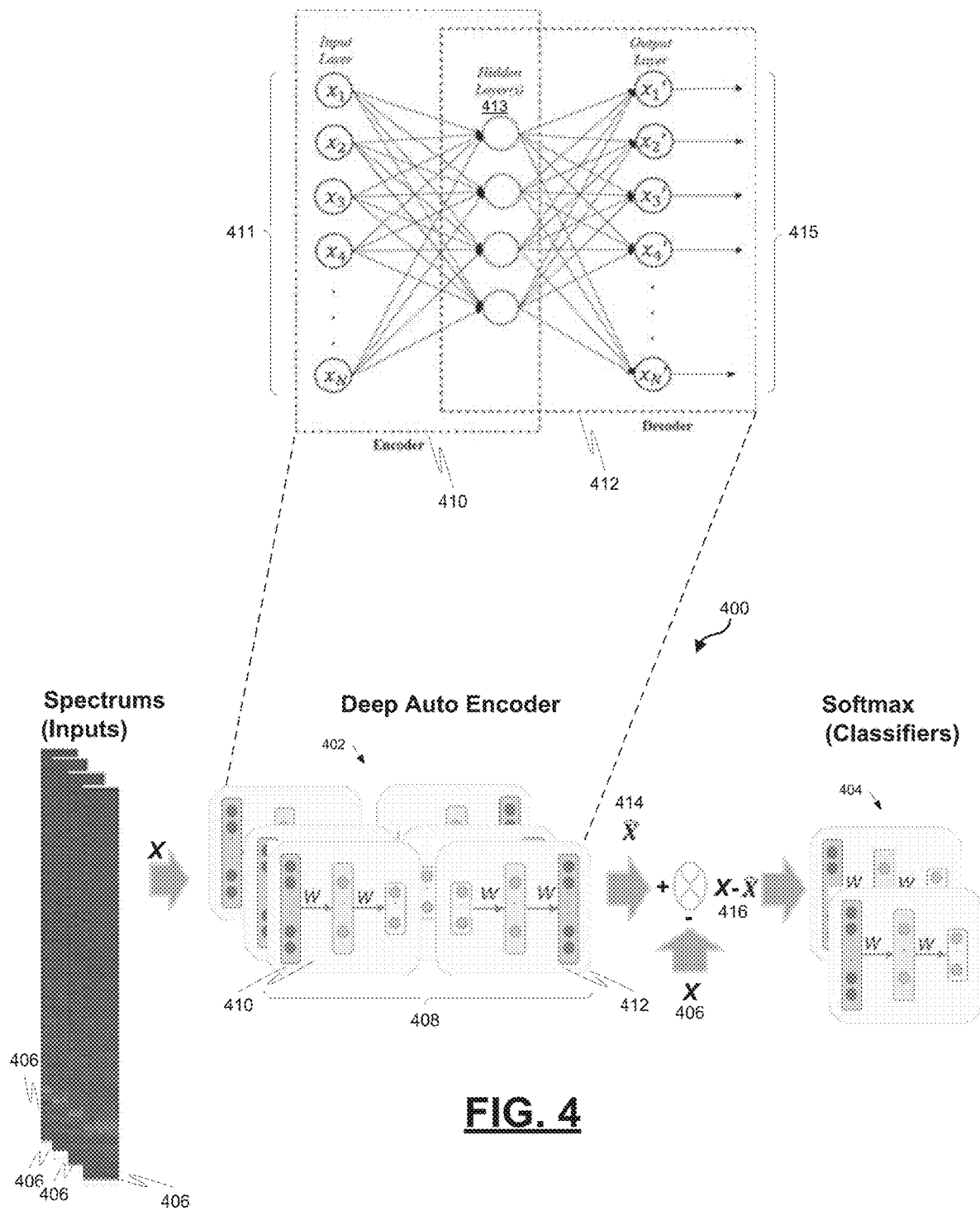
FIG. 4 is a block diagram depicting an example health classification system that includes a deep autoencoder system and a spectral residue classifier system, in accordance with some embodiments.

FIG. 4 is a block diagram depicting an example health classification system 400 that includes a deep autoencoder system 402 and a spectral residue classifier system 404. The deep autoencoder system 402 is configured to receive a plurality of different spectrums 406 as input, wherein each spectrum is directed to a frequency band that is specific to an aircraft part or component. Each spectrum has a magnitude component and a time component at different frequencies in the spectrum's frequency band.

The example deep autoencoder system 402 includes a plurality of deep autoencoders 408 wherein each autoencoder 408 is configured to receive a different one of the spectrums 406 as input. Each autoencoder is a feedforward neural network intended to reconstruct its own inputs. Each autoencoder includes an encoder network 410 and a decoder network 412. Each autoencoder includes a plurality of input nodes 411, a plurality of nodes in a plurality of hidden layers 413, and a plurality of output nodes 415 wherein the number of input nodes 411 is equal to the number of output nodes 415. Each autoencoder is trained using data for healthy aircraft components to generate weighting factors in the hidden layers that are configured to cause the input data for healthy aircraft components that are provided at input nodes to be reconstructed at the output nodes. The autoencoders may be trained using various types of machine learning algorithms, such as backpropagation in an unsupervised learning model.

The example deep autoencoder system 402 is configured to generate a plurality of output spectrums 414 from the plurality of input spectrums 406. Spectral residues 416 comprising the difference between the input spectrums 406 and output spectrums 414 are determined by the deep autoencoder system 402. The spectral residues 416 are input to a spectral classifier system 404 comprising one or more spectral classifiers. The spectral classifier system 404 is configured to analyze the spectral residues 416 to generate a health classification for one or more aircraft components. The spectral classifiers may be implemented using deep neural networks. Trend detection algorithms may be used to predict trends and to calculate component removal times.

In an example implementation, the physical characteristics of a gearbox may be utilized in a machine learning framework to diagnose specific component failures. The rotating mechanical components in the gearbox (e.g., the shaft, bearings, and gears) each have their own set of fundamental frequencies during the rotation. Specific faults associated with these components can be revealed through studying their associated frequencies within the entire spectrum. CIs can be designed and calculated based on specific portions of the spectrum and can be used in health monitoring. The component-specific frequencies can be isolated from the entire spectrum and the spectrum data at the component-specific frequencies can be input to the deep autoencoder system 402. The health classification system 400 can identify deviations from the nominal values, which, could indicate certain faults. The magnitude of the residuals between the output and input layer could thus be used for diagnosis of faults.

Figure 5:
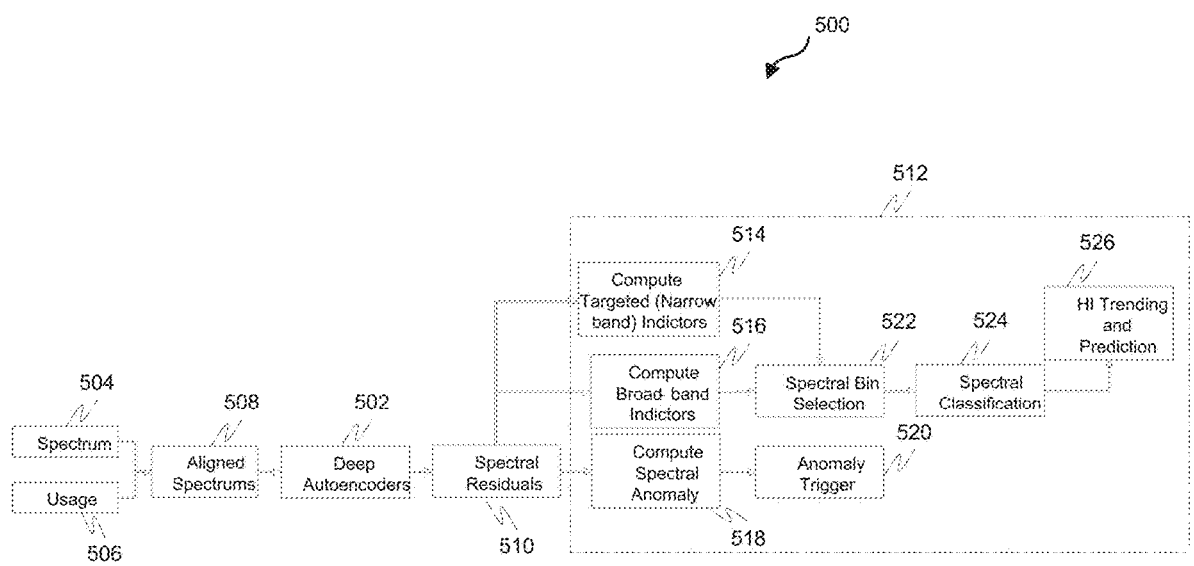
FIG. 5 is a block diagram depicting an example health prognostic system that contains an example deep autoencoder prognostic module that may be implemented onboard or off-board of an aircraft, in accordance with some embodiments

FIG. 5 is a block diagram depicting an example health prognostic system 500 that contains an example deep autoencoder prognostic module 502 that may be implemented onboard or off-board of an aircraft. Spectrum data 504 and usage data 506 (e.g., component usage hours) are combined to form aligned spectrums 508 that are input to the deep autoencoder prognostic module 502. The deep autoencoder prognostic module 502 is configured to analyze the aligned spectrums 508 and to generate spectral residues 510 for one or more aircraft components based on the analysis. The generated spectral residues 510 provide an indication regarding the health of the one or more aircraft components. The generated spectral residues 510 are input to a health classifier system 512, which analyzes the spectral residues 510 to generate health classification data for the one or more aircraft components.

In this example, the health classifier system 512 comprises a module 514 configured to compute targeted narrow band indicators, a module 516 configured to compute broad band indicators and a module 518 configured to compute a spectral anomaly (e.g., determine if the spectral residues indicate that there may be a problem with one or more of the components). The health classifier system 512 further includes a module 520 that is configured to determine if a potential anomaly identified by module 518 is indeed indicative a problem with one or more of the components. The health classifier system 512 further includes a spectral bin selection module 522 configured to organize the targeted narrow band indicators from module 514 and the broad band indicators from module 516 in appropriate bins. A spectral classification module 524 is configured to classify component failure types using the output from the spectral bin selection module 522. A health indicator trending and prediction module 526 is configured to generate health state trending and prediction information for one or more components.

FIG. 6A is a process flow chart depicting an example process 601 for training a model to generate prognostic indicators for aircraft maintenance. The training is performed offline before the model is put to use to generate prognostic indicators for aircraft maintenance.

The example process 601 includes retrieving aircraft health data for a plurality of aircraft components (operation 603). The aircraft health data may include mechanical systems condition indicator (CI) data, vibration spectrum data, resampled time-domain (RTD) data, and RTD spectrum data. The aircraft data may include data for unhealthy components before the components have been removed from the aircraft or data for healthy components.

The example process 601 includes retrieving aircraft component removal history data (operation 605). After component removal, component repair or teardown may take place leading to repair or teardown findings. The aircraft component removal history data may include data regarding the repair or teardown findings. The repair or teardown findings may be used to tag certain portions of the retrieved aircraft data with labels indicating data for one or more faulty component parts. As an example, a gearbox may be removed and the component parts inspected. The inspection may reveal a set of bad bearings. That information may allow for the tagging of retrieved aircraft data that was generated before the removal of the gearbox as including data indicating a faulty set of bearings in the gearbox.

The aircraft removal history data may also be used to tag certain portions of the retrieved aircraft data with labels indicating healthy data. For example, the aircraft data generated immediately after the replacement of a removed component may be considered healthy data.

The example process 601 includes training a model using the retrieved aircraft health data and the retrieved aircraft component removal history data using machine learning techniques (operation 607). Portions of the retrieved aircraft health data may be tagged as including healthy data and portions may be tagged as including unhealthy data. The model can be trained using the healthy and unhealthy data to recognize one or more faulty components.

As a result of the training, a trained prognostic model will be available for use in a process that uses prognostic indicators for aircraft maintenance. The trained prognostic model may be configured to generate health status information for at least one of the aircraft components. The health status information may include a health indicator and a prognostic indicator. The health indicator may provide an indication of the estimated current health of the component. The prognostic indicator may be configured to provide an indication of the estimated health of the component in one or more future time horizons.

FIG. 6B is a process flow chart depicting an example process 600 in an aircraft of using prognostic indicators for aircraft maintenance. The order of operation within the process is not limited to the sequential execution as illustrated in the figure, but may be performed in one or more varying orders as applicable and in accordance with the present disclosure. In various embodiments, the process can be scheduled to run based on one or more predetermined events, and/or can run continuously during operation of the aircraft.

The example process 600 includes retrieving aircraft health data for a plurality of aircraft components (operation 602). The aircraft health data may include mechanical systems condition indicator (CI) data, vibration spectrum data, resampled time-domain (RTD) data, and RTD spectrum data.

The example process 600 includes estimating component health status information for the plurality of aircraft components using a plurality of prognostic modules (operation 604). The example prognostic modules have been trained using machine learning techniques and using the techniques described with respect to process 601. Each prognostic module may be configured to generate health status information for at least one of the aircraft components. The health status information may include a health indicator and a prognostic indicator. The health indicator may provide an indication of the estimated current health of the component. The prognostic indicator may be configured to provide an indication of the estimated health of the component in one or more future time horizons.

Estimating component health status information may include estimating the health status information for at least one component using a deep autoencoder neural network wherein the deep autoencoder includes an encoder network and a decoder network and wherein the deep autoencoder includes a plurality of input nodes and an equal number of output nodes. The deep autoencoder may be trained using component-specific frequency portions of the spectrum of healthy data for the at least one component to generate weighting factors in hidden layers that are configured to cause the input data for healthy aircraft components that are provided at the input nodes to be reconstructed at the output nodes. The spectrum data at a pre-selected set of frequencies corresponding to the component-specific frequency portions of the spectrum of healthy data for the at least one component to the input nodes of the deep autoencoder may be provided to the input nodes. Estimating component health status information may further include computing spectral residues wherein the spectral residues include the difference between input spectrum applied at the input nodes of the deep autoencoder and output spectrum provided at the output nodes by the deep autoencoder, and estimating component health status information from the spectral residues.

The example process 600 further includes storing the component health status information for the aircraft components in a database onboard the aircraft (operation 606) and retrieving the health status information for a specific component from the database (operation 608).

The example process 600 also includes causing the display of the health status information for the specific component on an aircraft display (operation 610). Causing the display of the health status information may include causing the display of a graphical health indicator that indicates the predicted health state of a component during a plurality of time horizons in the future. As an example, a graphical health indicator for three time horizons may be displayed. Different colors may be used in the graphical health indicator to indicate the estimated health of the component in the plurality of time horizons. As an example, the colors green, yellow, and red may be used to indicate the estimated health of the component in a time horizon. The green color may indicate that the prognosis for the component during the time frame is good (e.g., component failure is not expected), the yellow color may indicate that the prognosis for the component during the time frame is cautious (e.g., component failure could occur), and the red color may indicate that the prognosis for the component during the time horizon is not good (e.g., component failure is predicted). Causing the display of the health status information may include generating health indicator trending and prediction data from the plurality of health state indicators and causing the display of the health indicator prediction data in a prediction horizon on an aircraft display wherein the prediction horizon includes a plurality of different time horizons for which the health indicator prediction data is valid.

The example process 600 may also include providing health status information from the aircraft database to a web server (operation 612). The web server may be configured to cause the display of a graphic visualization on a remote device wherein the graphic visualization is configured to display health status information retrieved from the aircraft database. The web server may be further configured to retrieve health status information from an off-board database wherein the off-board database includes health status information for a plurality of aircraft components for a plurality of aircraft, and cause the display of a second graphic visualization on the remote device wherein the second graphic visualization is configured to display health status information retrieved from the off-board database.

In one embodiment, a computer-implemented method in an aircraft of using prognostic indicators for aircraft maintenance is provided. The method includes retrieving aircraft health data for a plurality of aircraft components wherein the aircraft health data includes at least one of mechanical systems condition indicator (CI) data, vibration spectrum data, resampled time-domain (RTD) data, and RTD spectrum data. The method further includes estimating component health status information for the plurality of aircraft components using a plurality of prognostic modules wherein each prognostic module is configured to generate health status information for at least one of the aircraft components, the health status information includes at least one of a current health indicator and a prognostic indicator, the current health indicator provides an indication of the estimated current health of the component, and the prognostic indicator provides an indication of the estimated health of the component in one or more future time horizons. The method also includes storing the component health status information for the aircraft components in a database onboard the aircraft, retrieving the health status information for a specific component from the database, and causing the display of the health status information for the specific component on an aircraft display.

These aspects and other embodiments may include one or more of the following features. Estimating component health status information may include estimating the health status information for at least one component using a deep autoencoder neural network wherein the deep autoencoder includes an encoder network and a decoder network and wherein the deep autoencoder includes a plurality of input nodes and an equal number of output nodes. The deep autoencoder may be trained using component-specific frequency portions of the spectrum of healthy data and labels from repair or teardown findings for the at least one component to cause the input data for healthy aircraft components that are provided at the input nodes to be reconstructed at the output nodes. The method may further include providing the spectrum data at a pre-selected set of frequencies corresponding to the component-specific frequency portions of the spectrum of healthy data for the at least one component to the input nodes of the deep autoencoder. Estimating component health status information may further include computing spectral residues wherein the spectral residues include the difference between input spectrum applied at the input nodes of the deep autoencoder and output spectrum provided at the output nodes by the deep autoencoder, and estimating component health status information from the spectral residues. Causing the display of the health status information may include causing the display of a graphical health indicator that indicates the predicted health state of a component during a plurality of time horizons in the future. Causing the display of a graphical health indicator may include causing a color to be displayed in each time horizon in the graphical health indicator that indicates the predicted health state of the component during the time horizon. The method may further include providing health status information from the aircraft database to a server that is configured to cause the display of a graphic visualization on a remote device wherein the graphic visualization is configured to display health status information retrieved from the aircraft database. The server may be further configured to retrieve health status information from an off-board database wherein the off-board database includes health status information for a plurality of aircraft components for a plurality of aircraft, and cause the display of a second graphic visualization on the remote device wherein the second graphic visualization is configured to display health status information retrieved from the off-board database.

In another embodiment, a computer-implemented system configured to provide prognostic indicators for use in aircraft maintenance includes a computer-implemented prognostic system module on an aircraft wherein the computer-implemented prognostic system module is configured to retrieve aircraft health data for a plurality of aircraft components. The aircraft health data includes at least one of mechanical systems condition indicator (CI) data, vibration spectrum data, resampled time-domain (RTD) data, and RTD spectrum data. The computer-implemented prognostic system module is further configured to estimate component health status information for the plurality of aircraft components using a plurality of prognostic modules wherein each prognostic module is configured to generate health status information for at least one of the aircraft components, the health status information includes at least one of a current health indicator and a prognostic health indicator, the current health indicator provides an indication of the estimated current health of the component, and the prognostic health indicator provides an indication of the estimated health of the component in one or more future time horizons. The computer-implemented system further includes a computer-implemented display interface module that is configured to cause the display of the health status information for a user selected component from the plurality of aircraft components on an aircraft display.

These aspects and other embodiments may include one or more of the following features. The system may further include a computer-implemented database loader module that is configured to store the component health status information for the aircraft components in a database onboard the aircraft, and the computer-implemented display interface module may be further configured to retrieve the health status information for a user selected component from the database. At least one of the prognostic modules may implement a deep autoencoder neural network wherein the deep autoencoder is configured to estimate component health status information for at least one of the components, the deep autoencoder includes an encoder network and a decoder network, and the deep autoencoder includes a plurality of input nodes and an equal number of output nodes. The deep autoencoder may be trained using component-specific frequency portions of the spectrum of healthy data and labels from repair or teardown findings for the at least one component to cause the input data for healthy aircraft components that are provided at the input nodes to be reconstructed at the output nodes. The prognostic module that implements the deep autoencoder may be configured to compute spectral residues wherein the spectral residues include the difference between input spectrum applied at the input nodes of the deep autoencoder and output spectrum provided at the output nodes by the deep autoencoder; and configured to estimate component health status information from the spectral residues. The health status information the display interface module is configured to cause to be displayed may include a graphical health indicator that indicates the predicted health state of a component during a plurality of time horizons in the future. The display interface module may be configured to cause a color to be displayed for each time horizon in the graphical health indicator that indicates the predicted health state of the component during the time horizon. The system may further include a server configured to retrieve health status information from the aircraft database and cause the display of a graphic visualization on a remote device wherein the graphic visualization is configured to display health status information retrieved from the aircraft database. The server may be further configured to retrieve health status information from an off-board aircraft database wherein the off-board database includes health status information for a plurality of aircraft components for a plurality of aircraft and be further configured to cause the display of a second graphic visualization on the remote device wherein the second graphic visualization is configured to display health status information retrieved from the off-board database.

In another embodiment, an aircraft maintenance system for an aircraft includes one or more processors configured by programming instructions encoded on non-transient computer readable media. The system is configured to retrieve aircraft health data for a plurality of aircraft components wherein the aircraft health data includes at least one of mechanical systems condition indicator (CI) data, vibration spectrum data, resampled time-domain (RTD) data, and RTD spectrum data. The system is further configured to estimate component health status information for the plurality of aircraft components using a plurality of prognostic modules wherein each prognostic module is configured to generate health status information for at least one of the aircraft components, the health status information includes at least one of a current health indicator and a prognostic health indicator, the current health indicator provides an indication of the estimated current health of the component, and the prognostic health indicator provides an indication of the estimated health of the component in one or more future time horizons. The system is also configured to cause the display of the health status information for a user selected component from the plurality of aircraft components on an aircraft display.

These aspects and other embodiments may include one or more of the following features. The system may be further configured to store the component health status information for the aircraft components in a database onboard the aircraft and provide health status information from the aircraft database to a server that is configured to cause the display of a graphic visualization on a remote device wherein the graphic visualization is configured to display health status information retrieved from the aircraft database.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method, comprising:
retrieving, by one or more processors, aircraft health data for a plurality of aircraft components;
estimating, by the one or more processors, component health status information including a prognostic indicator for the plurality of aircraft components based on the aircraft health data, wherein:
the estimating includes generating the prognostic indicator using a machine learning model trained using historical aircraft health data known to be associated with a previously reported fault, wherein the historical aircraft health data comprises a first portion tagged as healthy data and a second portion tagged as unhealthy data;
the machine learning model embodies a deep autoencoder neural network, wherein the autoencoder includes at least one input node and at least one output node, and wherein input data comprising the historical health aircraft data is provided at the at least one input nodes and reconstructed as output data at the at least one output node; and
the prognostic indicator provides an indication of an estimated health of a component in a plurality of future time horizons; and
causing, by the one or more processors, display of the prognostic indicator for the plurality of future time horizons for a specific component on a display.

2. The method of claim 1, wherein the plurality of future time horizons includes at least a first time horizon and a second time horizon, and the method further includes:
causing, by the one or more processors, display of the prognostic indicator for each of the first and second time horizons for the specific component on the display.

3. The method of claim 1, wherein the causing the display of the prognostic indicator includes causing, by the one or more processors, a display of a graphical health indicator that indicates a predicted health state of the specific component during the plurality of future time horizons.

4. The method of claim 3, wherein the graphical health indicator that indicates the predicted health state includes at least:
a first graphical health indicator that indicates the estimated component health is healthy;
a second graphical health indicator that indicates the estimated component health is less than a first threshold; and
a third graphical health indicator that indicates the estimated component health is less than a second threshold, the second threshold being less than the first threshold.

5. The method of claim 4, wherein the causing the display of the graphical health indicator includes causing, by the one or more processors, a color to be displayed in the graphical health indicator that indicates the predicted health state of the specific component during the plurality of future time horizons.

6. The method of claim 5, wherein causing a color to be displayed includes causing, by the one or more processors, a first color to be displayed corresponding to the first graphical health indicator, a second color to be displayed corresponding to the second graphical health indicator, and a third color to be displayed corresponding to the third graphical health indicator.

7. The method of claim 1, wherein the causing display of the prognostic indicator includes causing, by the one or more processors, a display of a graphical visualization indicating the health status information.

8. A system, comprising:
a memory having processor-readable instructions therein; and
at least one processor configured to access the memory and execute the processor-readable instructions, which when executed by the at least one processor configures the at least one processor to perform a plurality of functions, including functions for:
retrieving aircraft health data for a plurality of aircraft components;
estimating component health status information including a prognostic indicator for the plurality of aircraft components based on the aircraft health data, wherein:
the estimating includes generating the prognostic indicator using a machine learning model trained using historical aircraft health data known to be associated with a previously reported fault;
the historical health aircraft data comprising a first portion tagged as healthy data and a second portion tagged as unhealthy data;
the machine learning model embodies a deep autoencoder neural network, wherein the autoencoder includes at least one input node and at least one output node, and wherein input data comprising the historical health aircraft data is provided at the at least one input nodes and reconstructed as output data at the at least one output node; and
the prognostic indicator provides an indication of an estimated health of a component in a plurality of future time horizons; and
causing, by the one or more processors, display of the prognostic indicator for the plurality of future time horizons for a specific component on a display.

9. The system of claim 8, wherein the plurality of future time horizons includes at least a first time horizon and a second time horizon, and the plurality of functions further include functions for:
causing display of the prognostic indicator for each of the first and second time horizons for the specific component on the display.

10. The system of claim 8, wherein the causing the display of the prognostic indicator includes causing a display of a graphical health indicator that indicates a predicted health state of the specific component during the plurality of future time horizons.

11. The system of claim 10, wherein the graphical health indicator that indicates the predicted health state includes at least:
a first graphical health indicator that indicates the estimated component health is healthy;
a second graphical health indicator that indicates the estimated component health is less than a first threshold; and
a third graphical health indicator that indicates the estimated component health is less than a second threshold, the second threshold being less than the first threshold.

12. The system of claim 11, wherein the causing the display of the graphical health indicator includes causing a color to be displayed in the graphical health indicator that indicates the predicted health state of the specific component during the plurality of future time horizons.

13. The system of claim 12, wherein causing a color to be displayed includes causing, by the at least one processor, a first color to be displayed corresponding to the first graphical health indicator, a second color to be displayed corresponding to the second graphical health indicator, and a third color to be displayed corresponding to the third graphical health indicator.

14. The system of claim 8, wherein the causing display of the prognostic indicator includes causing a display of a graphical visualization indicating the health status information.

15. A non-transitory computer-readable medium containing instructions, comprising:
- retrieving, by one or more processors, aircraft health data for a plurality of aircraft components;
- estimating, by the one or more processors, component health status information including a prognostic indicator for the plurality of aircraft components based on the aircraft health data, wherein:
  - the estimating includes generating the prognostic indicator using a machine learning model trained using historical aircraft health data known to be associated with a previously reported fault;
  - the historical health aircraft data comprising a first portion tagged as healthy data and a second portion tagged as unhealthy data;
  - the machine learning model embodies a deep autoencoder neural network, wherein the autoencoder includes at least one input node and at least one output node, and wherein input data comprising the historical health aircraft data is provided at the at least one input nodes and reconstructed as output data at the at least one output node; and
  - the prognostic indicator provides an indication of an estimated health of a component in a plurality of future time horizons; and
- causing, by the one or more processors, display of the prognostic indicator for the plurality of future time horizons for a specific component on a display.

16. The non-transitory computer-readable medium of claim 15, wherein the plurality of future time horizons includes at least a first time horizon and a second time horizon, and the instructions further include:
- causing, by the one or more processors, display of the prognostic indicator for each of the first and second time horizons for the specific component on the display.

17. The non-transitory computer-readable medium of claim 15, wherein the causing the display of the prognostic indicator includes causing, by the one or more processors, a display of a graphical health indicator that indicates a predicted health state of the specific component during the plurality of future time horizons.

18. The non-transitory computer-readable medium of claim 17, wherein the graphical health indicator that indicates the predicted health state includes at least:
- a first graphical health indicator that indicates the estimated component health is healthy;
- a second graphical health indicator that indicates the estimated component health is less than a first threshold; and
- a third graphical health indicator that indicates the estimated component health is less than a second threshold, the second threshold being less than the first threshold.

19. The non-transitory computer-readable medium of claim 18, wherein the causing the display of the graphical health indicator includes causing, by the one or more processors, a color to be displayed in the graphical health indicator that indicates the predicted health state of the specific component during the plurality of future time horizons.

20. The non-transitory computer-readable medium of claim 19, wherein causing a color to be displayed includes causing, by the one or more processors, a first color to be displayed corresponding to the first graphical health indicator, a second color to be displayed corresponding to the second graphical health indicator, and a third color to be displayed corresponding to the third graphical health indicator.

* * * * *